June 14, 1960
M. F. TOOHIG
2,940,873
METHOD OF INCREASING THE THICKNESS OF
FINE MESH METAL SCREENS
Filed July 18, 1957
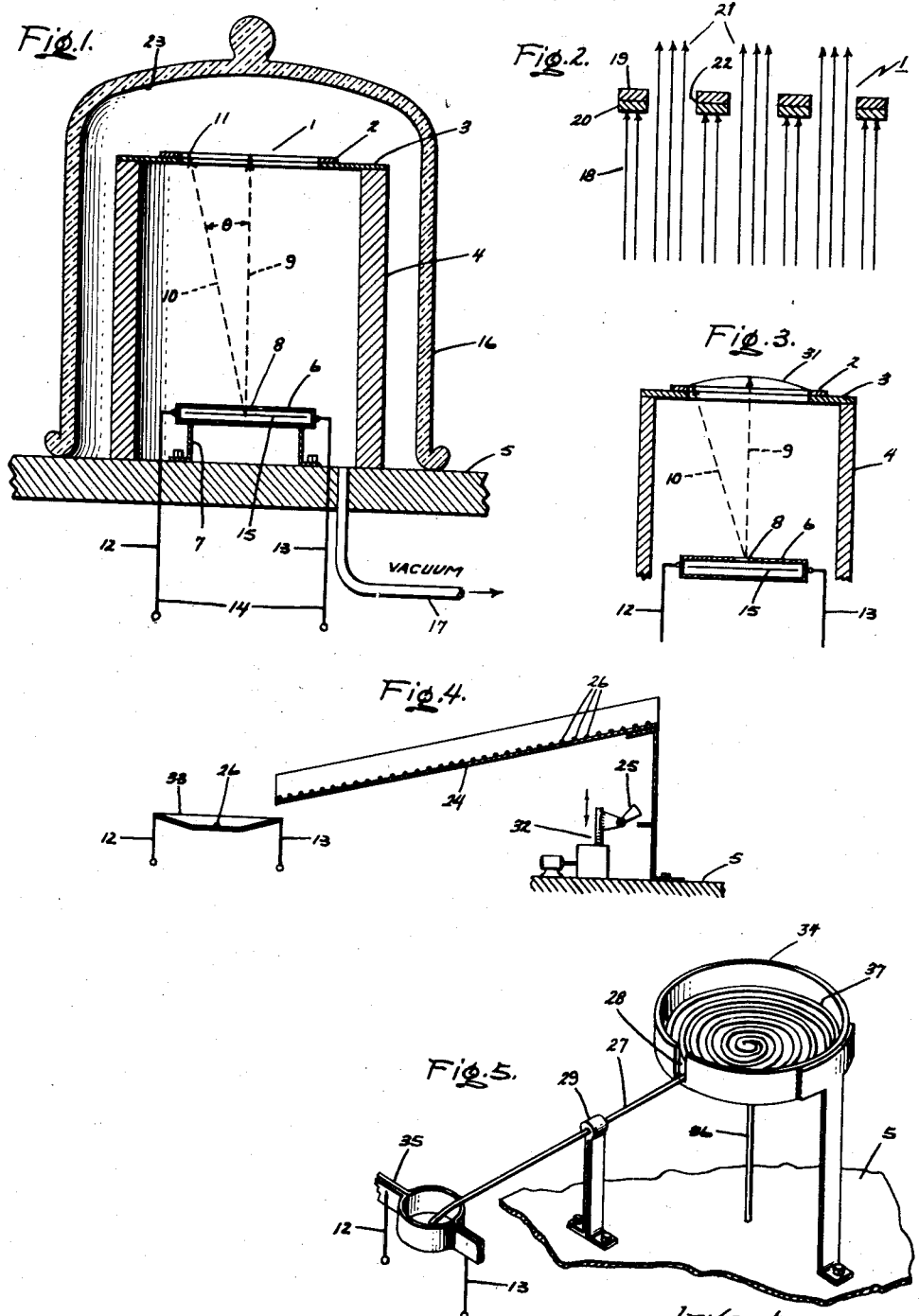
Inventor:
Michael F. Toohig,
by  Just & Irish
Attorney.

United States Patent Office 2,940,873
Patented June 14, 1960

2,940,873

METHOD OF INCREASING THE THICKNESS OF FINE MESH METAL SCREENS

Michael Francis Toohig, Fort Wayne, Ind., assignor to International Telephone and Telegraph Corporation Filed July 18, 1957, Ser. No. 672,754

2 Claims. (Cl. 117—99)

This invention relates to electron discharge devices of the type employing fine mesh metal screens, and more particularly to a method of increasing the thickness of such screens.

Fine mesh metal screens are employed in various types of electron discharge tubes, e.g., as the barrier grid of a target electrode in barrier grid storage tubes, as a collector screen or insulator screen in direct-view storage tubes, or as a screen in cathode ray tubes having post-deflection acceleration. It is important that such screens be relatively thick; in the case of barrier-grid storage tubes particularly, a relatively thick screen or grid is desired in order to prevent "rain-back" of secondary emission electrons from one grid opening into adjacent openings, thus adversely affecting resolution.

In the past, grids which are initially relatively thick have been provided by etching sheet metal in a pattern to obtain on the order of 250 meshes per square inch or less, however, it has not been possible to obtain appreciably finer meshes by this process. Thick grids have also been provided by weaving fine wire, such as stainless steel, in the order of .001 inch in diameter and such woven mesh screens can be as fine as 400 meshes per inch. However, with woven mesh screens having this high a mesh, the transmission, i.e., the total apertured area with reference to the total area of the screen, is only on the order of 35% and, further, the pattern is irregular in cross-sectional aspect. Yet another prior technique for producing a relatively thick grid has been to fabricate a screen of parallel wires having on the order of 500 wires per inch and there is superimposed at an angle of forty-five degrees (45°) on such array of wires another group of parallel wires thus forming a screen. By using tungsten wire 0.3 inch, grids 1.2 mils thick have been obtained having a transmission as high as 50%. While a mesh of this type has adequate thickness and transmission, its usefulness in limited in such applications as barrier grids for flat target electrodes.

The best fine mesh screens presently available in the range from 300 to 2,000 meshes per inch are produced by a ruling process. In this technique, a glass master is coated with wax and the mesh pattern is ruled thereon. From this ruling, an electroplating matrix is produced by a photo-resist technique on a copper plate and a thin screen of the desired pattern is then plated on this matrix. While such grids initially have a high transmission, depending on the transmission of the ruled master, they are relatively thin. In the past, the thickness of such fine mesh screens has been increased by electroplating, however with a resulting substantial decrease in the transmission due to accumulation of metal in the apertures of the screen.

Techniques have been proposed to vary the electric fields in the mesh during the plating process in order to prevent metal from being deposited on the sides of the apertures, however insofar as the applicant is aware, none of these proposals have proved to be satisfactory, where the mesh is fine.

It is therefore desirable to provide a method for increasing the thickness of a fine mesh metal screen for use in barrier grid storage tubes, direct-view storage tubes, and other electron discharge tubes, in which there is relatively little filling of the screen apertures, i.e., reduction in transmission.

I have discovered that the thickness of a thin fine mesh metal screen can be substantially increased without appreciable reduction in transmission by evaporating metal onto the screen from a point source in a high vacuum. The metal molecules emanating from this point source in a vacuum, where the mean free path of the molecules is long compared to the spacing between the point source and the screen, travel in straight lines to the screen; the molecules which impinge on the web of the screen accumulate thereon thereby to increase the thickness, and the other molecules pass directly through the apertures and condense on a surface beyond and therefore are not deposited on the sides of the apertures thereby to reduce the transmission of the screen. Thus, as long as the metal molecules approach the screen at essentially normal incidence, the screen will be increased in thickness without appreciably decreasing its transmission. The screen must therefore be positioned far enough from the source to assure essentially normal incidence of the metal molecules.

It is therefore an object of my invention to provide an improved method for increasing the thickness of fine mesh metal screens without any appreciable filling of the screen apertures which would thereby decrease the transmission of the screen.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a cross-sectional view diagrammatically illustrating the apparatus for performing the improved method of my invention as applied to flat fine mesh screens;

Fig. 2 is a fragmentary cross-sectional view, greatly enlarged, showing the condensation action of the metallic vapor stream flowing from the evaporation source;

Fig. 3 is a fragmentary cross-sectional diagrammatic view similar to Fig. 1 showing the application of my process to bowl-shaped screens;

Fig. 4 is a fragmentary cross-sectional view showing apparatus for feeding pellets of metal to be evaporated into the evaporating receptacle; and Fig. 5 shows apparatus for feeding an elongated metal rod or wire into the metal evaporating receptacle.

Referring now to Fig. 1, the relatively thin fine mesh screen 1, which may be annular in configuration for use in such a device as a barrier grid storage tube, is stretched on an annular metal mounting ring 2 in order that it may be maintained flat and taut. The mounting ring 2 with the screen 1 assembled thereon rests on an annular metal ring 3 which in turn rests on an annular metal support 4 standing on a base plate 5. A high melting point receptacle 6 formed of suitable metal, such as tantalum, and shown here as being in the form of a tube with closed ends, is positioned within the annular supporting member 4 and mounted on the base plate 5 by means of suitable supports 7. Receptacle 6 has a small opening 8, for example approximately 0.1 inch in diameter, formed in its wall facing screen 1. The screen 1 is spaced from the opening 8 so that a line 9 extended from the opening to the center of the screen 1 is normal thereto and a line 10 from the opening 8 to the outer periphery 11 of the screen 1 defines an angle θ which preferably should be less than thirteen degrees (13°); as will be more fully explained hereinafter, it is important that the metallic vapor molecules emanating from the opening 8 in receptacle 6 impinge on the mesh of the screen 1 with essentially normal incidence and thus it is seen that the screen 1 must be substantially spaced from the opening 8 and the angle θ relatively small in order that essentially normal incidence be provided. In addition, since the metal vapor has a cosine density distribution, the angle θ should be kept as small as possible in order to produce a uniformly thick screen.

The metal receptacle 6 is arranged to be heated by passing an electric current therethrough and thus electrical leads 12 and 13 are attached to receptacle 6 and passed through base plate 5 for connection to terminals 14. Terminals 14 may be connected to any suitable source of power having an adequate current capacity. A quantity of metal, such as pieces of wire 15, are arranged within the receptacle 6 and the entire assembly is positioned within a suitable container, such as a bell jar 16, which is evacuated by suitable vacuum pump apparatus (not shown) through vacuum line 17.

In order to evaporate metal onto the surface of screen 1 facing the opening 8, an electric current, which may be on the order of 275 amperes, is passed through the receptacle 6 by means of leads 12 and 13 so that the receptacle is heated to a sufficiently high temperature to melt and boil the metal 15 therein. The boiling of this metal causes a vapor pressure to build up in the receptacle, and this vapor is forced out of the receptacle through the small opening 8. This vapor is composed of metal molecules having relatively high molecular velocity by virtue of their high temperature. The vapor emitted from the opening 8 emanates with a cosine intensity distribution when the temperature of the receptacle is sufficiently high and the metal molecules travel in straight lines from the opening 8 to the screen 1. These metal molecules approach the screen 1 at essentially normal incidence, and, as shown in Fig. 2, where the molecules 18 impinge upon the web portions 19 of the screen, they condense on the surface thereof thereby increasing the thickness as at 20. Other molecules 21, however, pass through the apertures 22 in the screen and will condence on the inner surface 23 of the container 16. It will be readily apparent that with a flat screen as shown in Fig. 1, the metal vapor molecules will actually impinge on the screen 1 with normal incidence only at the center of the screen and that those impinging upon the outer periphery 11 of the screen will not have exactly normal incidence; it is thus seen that it is important to maintain the angle θ as small as possible so that there is a minimum buildup of metal by evaporation on the interior surfaces of the apertures adjacent the outer periphery of the screen.

Referring now to Fig. 3, in which like elements are indicated by like reference numerals, co-pending application Ser. No. 668,671, filed June 28, 1957, of Cyril L. Day, and assigned to the assignee of the present application, describes a bowl-shaped target electrode for a barrier grid storage tube which employs a bowl-shaped screen and application Ser. No. 668,643, filed June 28, 1957, now abandoned, also of Cyril L. Day, and assigned to the assignee of the present application, discloses apparatus for forming such bowl-shaped screens. When such a bowl-shaped or preferably spherical-shaped screen 31 has its thickness increased by the method of my invention, as shown in Fig. 3, it will be readily apparent that if the receptacle 6 is arranged with its opening 8 at the center of curvature of the screen 31, the metal molecules emanating from the opening 8 will impinge upon the screen 31 with normal incidence throughout its entire area. Thus, with the csreen 31 having a diameter of 4½ inches and a radius of curvature of 4½ inches, the opening 8 of receptacle 6 will be preferably spaced from the inner surface of screen 31 a distance of 4½ inches; and this is in contrast with the arrangement of Fig. 1 in which with a screen 1 having a diameter of five (5) inches the opening 8 has been spaced eleven (11) inches therefrom. Since the emitted vapor has a cosine density distribution it may be necessary to move the spherically-shaped screen over a hemispherical surface of the same radius of curvature with a mechanical device, e.g., much like those used for grinding and polishing curved surfaces in the optical trade, if it is desired that the final thickness of the screen be uniform throughout.

In order to provide sufficient metal for increasing the thickness of the screen to a desired degree, it may be desirable to provide a mechanical feed to pour the metal into the receptacle 6 and thus in Fig. 4 there is shown such an arrangement in which an open receptacle 33 has a magazine portion 24 with a hammer-actuated feed mechanism 25 arranged so that the hammer 25 can be rotated on shaft 32 by means of a control outside of the bell jar 16. Small pellets 26 of the metal to be evaporated in receptacle 6 are positioned in the magazine 24 and are admitted to the receptacle by actuation of the hammer 25. These pellets 26 are small enough so that when melted they act essentially as a point source. Another arrangement for continuously feeding the metal for evaporation into the receptacle 6 is shown in Fig. 5 in which a metal rod or wire 27 passes through an opening 28 in an end of the wire container 34 and is fed into the receptacle 35 through guide 29 by means of a wire feeding mechanism actuated by rotating the wire coiled on the disc 37 mounted on top of shaft 36. This is done by rotating shaft 36 from outside of the bell jar 16 by conventional means.

The process and apparatus of Fig. 4 has been used for increasing the thickness of fine mesh nickel screens by evaporating silver pellets; a screen having an initial thickness of 0.0002 inch with a 400 mesh and a 65% transmission had its thickness increased to 0.0011 inch and its transmission only reduced to 48%; comparable results have been obtained using the apparatus of Fig. 1. This is appreciably better than would be obtained if the screen were thickened by conventional electroplating; when these screens are thickened by electroplating to .00065 inch, the transmission is 36%.

While the process described above in connection with Fig. 1 has been conventionally employed for increasing the thickness of a copper screen by evaporating copper thereon and by evaporating silver on nickel base screens by the method of Fig. 4, it will be readily understood that screens formed of other metals may be employed and that other metals such as gold or nickel may be evaporated thereon, it not being essential that the screen itself and the metal evaporated thereon be the same.

It will now be seen that I have provided an improved method for increasing the thickness of a relatively thin fine mesh metal screen without appreciable filling of the screen apertures to thereby substantially decrease the transmission.

While I have described above the principles of my invention in connection with specific apparatus, it is to be clearly understood that this description is made only by way of example and not as a limitation to the scope of my invention.

What is claimed is:
1. The method of increasing the thickness of a flat metal screen having a mesh finer than 300 and being formed in a spherical configuration without substantial filling of the apertures therein comprising the steps of: positioning a receptacle in a container, placing a quantity of metal in said receptacle, positioning the screen in said container spaced above a point in said receptacle with said point being located at the center of curvature of said screen; evacuating said container; heating said receptacle to a temperature sufficient to melt and boil said metal therein whereby the vapor formed by said boiling emanates from said point and is deposited on the surface of said screen; and continuing said heating until the thickness of said screen is substantially increased.

2. The method of increasing the thickness of a flat metal screen having a mesh finer than 300 without appreciable filling of the apertures therein comprising the steps of: positioning a receptacle in a container having a quantity of metal disposed therein; positioning the screen in said container spaced above said receptacle so that a line from a point in said receptacle is normal to the center of said screen and a line from said point in said receptacle to the peripheral edge of said screen defines an angle less than 13° with said normal line; evacuating said container; vaporizing said metal in said receptacle so that the vapor emanates from said point and is deposited on the surface of said screen; and continuing said vaporizing until the thickness of said screen is substantially increased.

References Cited in the file of this patent

UNITED STATES PATENTS

| | | |
|---|---|---|
| 2,118,186 | Farnsworth | May 24, 1938 |
| 2,405,662 | McManus et al. | Aug. 13, 1946 |
| 2,595,216 | Pace | May 6, 1952 |
| 2,665,229 | Schuler et al. | Jan. 5, 1954 |
| 2,732,313 | Cusano et al. | Jan. 24, 1956 |
| 2,759,861 | Collins et al. | Aug. 21, 1956 |